(12) United States Patent
Betzen et al.

(10) Patent No.: US 9,359,796 B2
(45) Date of Patent: Jun. 7, 2016

(54) LOCKING ARRANGEMENT FOR A MOTOR VEHICLE LID

(71) Applicant: GM GLOBAL TECHNOLOGY OPERATIONS LLC, Detroit, MI (US)

(72) Inventors: Heiko Betzen, Bausendorf (DE); Markus Frommann, Bingen am Rhein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 14/192,495

(22) Filed: Feb. 27, 2014

(65) Prior Publication Data

US 2014/0239646 A1    Aug. 28, 2014

(30) Foreign Application Priority Data

Feb. 27, 2013    (DE) ...................... 20 2013 001 917 U

(51) Int. Cl.
*E05C 1/06*    (2006.01)
*E05B 83/00*    (2014.01)
(Continued)

(52) U.S. Cl.
CPC ................. *E05B 83/00* (2013.01); *E05B 81/40* (2013.01); *E05B 83/34* (2013.01); *E05B 85/28* (2013.01); *E05C 19/02* (2013.01); *E05C 19/022* (2013.01); *E05C 19/028* (2013.01); *B60K 15/05* (2013.01); *B60K 2015/0576* (2013.01); *Y10T 292/1015* (2015.04)

(58) Field of Classification Search
CPC .............. Y10T 292/54; Y10T 292/546; Y10T 292/558; Y10S 292/04; B60K 15/05; B60K 2015/0561; E05C 19/02; E05C 19/022; E05C 19/028; E05B 83/28; E05B 83/34
USPC ........................... 292/139, DIG. 4; 296/97.22
See application file for complete search history.

(56) References Cited

U.S. PATENT DOCUMENTS 5,211,431 A * 5/1993 Koizumi ............... E05C 19/022
                                                      292/81
5,381,586 A * 1/1995 Busscher ................. B60N 3/10
                                                      16/297

(Continued)

FOREIGN PATENT DOCUMENTS

DE        4343976 A1 *  6/1995    .......... A47L 15/4257
DE       10118394 A1    11/2002

(Continued)

OTHER PUBLICATIONS

Search Report dated Aug. 29, 2014 in GB1402763.5.

*Primary Examiner* — Carlos Lugo
(74) *Attorney, Agent, or Firm* — Ingrassia Fisher & Lorenz PC

(57) ABSTRACT

A locking arrangement for a pivotable lid of a motor vehicle is disclosed. The locking arrangement includes an axially displaceable guided bolt which releasably engages with the lid. A rotatably mounted rocker is coupled to the bolt. A slotted link guide is arranged on a circumferential side of the rocker about its axis of rotation. The slotted link guide has a channel and a sliding element which is guided therein. The channel has an engagement position and counteracts movement of the sliding element out of the engagement position against a predetermined passage direction. The locking arrangement can be alternately brought into and out of engagement with the lid through successive axial displacements in order to lock or unlock the lid.

13 Claims, 3 Drawing Sheets

(51) Int. Cl.
*E05C 19/02* (2006.01)
*E05B 85/28* (2014.01)
*E05B 81/40* (2014.01)
*E05B 83/34* (2014.01)
*E05C 1/00* (2006.01)
*B60K 15/05* (2006.01)

(56) References Cited

U.S. PATENT DOCUMENTS

| | | | | |
|---|---|---|---|---|
| 7,407,200 | B2* | 8/2008 | Ichimaru | E05C 17/02 |
| | | | | 292/194 |
| 8,052,181 | B2* | 11/2011 | Nishida | B60N 3/083 |
| | | | | 292/332 |
| 8,393,651 | B2* | 3/2013 | Suzuki | E05B 77/06 |
| | | | | 292/1 |
| 8,398,127 | B2* | 3/2013 | Persiani | B60K 15/05 |
| | | | | 292/137 |
| 2010/0045049 | A1 | 2/2010 | Persiani et al. | |
| 2010/0187837 | A1* | 7/2010 | Danner | B60K 15/05 |
| | | | | 292/164 |

FOREIGN PATENT DOCUMENTS

| | | | |
|---|---|---|---|
| DE | 102007011541 A1 | 9/2008 | |
| DE | 102008032758 A1 | 1/2010 | |
| DE | 102012011440 * | 12/2013 | ............ E05B 77/42 |
| FR | 2845646 A1 * | 4/2004 | ............ B60K 15/05 |
| GB | 2394251 A | 4/2004 | |
| WO | 0128798 A | 4/2001 | |
| WO | 2012049733 A1 | 4/2012 | |

* cited by examiner

LOCKING ARRANGEMENT FOR A MOTOR VEHICLE LID

CROSS REFERENCE TO RELATED APPLICATION

This application claims priority to German Patent Application No. 202013001917.4 filed Feb. 27, 2013, which is incorporated herein by reference in its entirety.

TECHNICAL FIELD

The present disclosure relates to a locking arrangement for a pivotable lid of a motor vehicle and to a motor vehicle, in particular to a passenger car, having a pivotable lid, in particular a tank lid, and such a lid locking arrangement.

BACKGROUND

From US 2010/0045049 A1 a lid locking arrangement for a pivotable lid of a motor vehicle is disclosed with an axially displaceably guided bolt for the releasable engagement with the lid. A rocker which is coupled to this bolt and a slotted link guide with a slotted link channel which is formed in the shape of a heart and a sliding element guided therein is known.

The bolt includes a rotary guide, through which during the axial displacement it is helically rotated about its axis. Because of this, protrusions of the bolt enter into or out of engagement with corresponding recesses of the lid in order to lock or unlock the latter.

The sliding element is arranged on a face end of the bolt-distal arm of the rocker with respect to its axis of rotation and engages in the slotted link channel in an engagement direction which is parallel to the axis of rotation of the rocker. The arm in this direction is designed in a bending-elastic manner and preloads the sliding element against a stepped channel base of the slotted link channel, which has an engagement position and counteracts a movement of the sliding element against a predetermined passage direction.

The lid locking arrangement of US 2010/0045049 A1 realizes a so-called "push-push" function by pressing down the closed lid which is locked through the lid locking arrangement. The sliding element is forced out of the engagement position in the predetermined passage direction, which releases an axial extension of the bolt through a preloaded spring. In the process, the protrusions of the bolt rotate out of engagement and unlock the lid, which can be subsequently pivoted open further, manually. By subsequently pressing the lid down again, the bolt is axially retracted while preloading the spring. In the process, the sliding element is forced back into the engagement position in the predetermined passage direction so as to inhibit a rotating of the rocker, and thus an extending of the bolt which is coupled therewith. The protrusions of the bolt rotate into engagement in the process and lock the lid.

An object of an embodiment of the present disclosure is to make available a motor vehicle, in particular a passenger car, with an improved lid locking arrangement for the locking or unlocking of a pivotable lid, in particular of a tank lid.

A motor vehicle, in particular a passenger car, according to an aspect of the present disclosure includes a pivotable lid. This can be in particular a tank lid for closing a tank opening for refueling the vehicle with fuel and/or for charging an energy storage unit of the vehicle with electric energy. In an embodiment, the pivotable lid is preloaded in a pivoting-open direction in particular through a spring means, in order to support an in particular manual pivoting-open following unlocking. Equally, the pivotable lid can be preloaded against the pivoting-open direction, in particular through a spring means, in order to reset the lid into an at least substantially closed position. The pivotable lid can be pivoted manually and/or motorized.

SUMMARY

According to an aspect of the present disclosure, a push-push function is made available through a lid locking arrangement: through successive pressing-down of the lid the latter is alternately locked and unlocked.

In particular for this, a lid locking arrangement according to an aspect of the present disclosure includes an axially displaceably guided bolt for the releasable positively locking and/or frictionally locking engagement in the lid. In an embodiment, the bolt is at least substantially guided axially displaceably in a rotationally fixed manner. In a further development, the bolt is positively guided in a rotationally fixed manner in particular through at least one axial groove, so that during an axial displacement it does not perform any rotary movement about its displacement axis at least substantially. Because of this, the movement or guiding of the bolt can be improved in an embodiment, in particular the risk of canting or self-locking reduced. In an embodiment, the bolt can include an at least substantially cylindrical outer contour.

A rocker is rotatably mounted about an axis of rotation and coupled to the bolt in such a manner that an axial retracting and extending of the bolt brings about rotary movements of the rocker about its axis of rotation in the opposite direction. In an embodiment in a manner which is shown in US 2010/0045049 A1, the teaching of which in this regard is expressly rendered the content of the present disclosure, the rocker can be coupled to the bolt, in particular by means of a fork joint.

A slotted link guide includes a slotted link channel and a sliding element guided therein, wherein the slotted link channel has an engagement position and counteracts a movement of the sliding element out of the engagement position against a predetermined passage direction. The slotted link channel, in particular a channel base, can in an embodiment be singly or multiply stepped or include shoulders, of which one can define the engagement position. The sliding element can, at least adjacent to the engagement position or throughout the entire slotted link channel, be elastically preloaded against the stepped slotted link channel, in particular its channel base. In an embodiment, the slotted link channel counteracts a movement of the sliding element against a predetermined passage direction in particular in a positively locking manner on discreet locations which are defined by shoulders and can in particular positively block such a movement in discrete locations which are defined by shoulders.

The sliding element can be formed in particular cylindrically and engage in the slotted link channel in its cylinder longitudinal axis. In an embodiment, the slotted link channel is formed in the shape of a heart. This, in particular in a generalizing manner is to mean a shape including two concave portions running in opposite direction, wherein in a transition between these two portions the engagement position can be formed. One of these portions can be extended in an embodiment beyond a transition located opposite this engagement position between the two portions. The slotted link channel in an embodiment is singly or multiply stepped in the preloading direction or includes one or multiple, in particular ramp or step-like shoulders, in particular a shoulder which adjoins or defines the engagement position. These shoulders counteract a movement of the sliding element against the predetermined passage direction or positively block said movement: the sliding element can be moved through the slotted link channel in passage direction and on riding over a shoulder engage in or dip more deeply into the slotted link channel behind said shoulder. Through a ramp-like shoulder on further movement in passage direction it can be again lifted against the engagement direction in particular against an elastic preload. In an embodiment, the slotted link channel can be formed in the manner shown in US 2010/0045049 A1, the teaching of which in this regard is also expressly included in the content of the present disclosure. Engagement direction here is to mean in particular a direction which, at least substantially, is perpendicular to the passage direction and/or parallel to a channel wall. When a portion of a heart-shaped slotted link channel is extended beyond a transition located opposite the engagement position between the two portions, the other portion can merge into this extended portion in particular with a ramp-like shoulder so that this shoulder counteracts a movement of the sliding element against the passage direction in the other portion.

According to an aspect of the present disclosure, a slotted link guide is arranged on a circumferential side of the rocker about the axis of rotation of the latter. A circumferential or surface side about an axis of rotation in this case is to mean in particular a surface of the rocker, which includes a tangent which is substantially parallel to the axis of rotation, and/or a surface or tangential plane(s) thereof which does not intersect the axis of rotation. In an embodiment, the circumferential side of the rocker can be at least substantially formed rotation-symmetrically about the axis of rotation of the rocker.

Through the arrangement of the slotted link guide on a circumferential side instead of on a face end of the rocker as in US 2010/0045049 A1, a bearing loading of the rocker mounting can be improved through a tilting moment. Additionally or alternatively, an installation space in the direction of the axis of rotation of the rocker can be reduced.

The slotted link channel in an embodiment can be arranged in a fixed manner, in particular on a housing of the lid blocking arrangement, on which the rocker in an embodiment is rotatably mounted. The sliding element can then be arranged in particular on the circumferential side of the rocker. In another embodiment, the slotted link channel is conversely arranged on the circumferential side of the rocker, in particular integrally formed with the latter, e.g., cast or injection molded, or produced on said rocker in a material-removing manner, e.g., milled. The sliding element can then be arranged in particular on the housing of the lid locking arrangement. In both cases, the sliding element in a further development can be preloaded against the slotted link channel through a spring means, for example a compression spring, which loads a bolt which is displaceably guided in engagement or preloading direction.

Alternatively, the sliding element can be arranged on a carrier which is elastically formed in preloading direction. The carrier can be formed in particular in the shape of a bar and/or be fastened to the housing in a fixed or moveable manner on an end that is located opposite the sliding element, in particular rotatably mounted.

In that in an embodiment the elastic preload is not or not exclusively imposed through the rocker, but for example through the carrier or a housing-fixed spring means, the bearing loading and/or a risk of canting and/or self-inhibition of the rocker can be advantageously reduced. Additionally or alternatively, the rocker can be formed stiff and thus more reliably. As explained above, the sliding element in an embodiment is elastically preloaded against the channel base at least adjacent to the engagement position. This preload non-positively counteracts an overrunning of the shoulder against the predetermined passage direction. In a further development, the sliding element can be at least substantially preloaded over the entire slotted link channel against the channel base of the latter, in particular in order to improve guidance. Equally, the sliding element, for example in the rest position, can also be relaxed or not preloaded against the channel base.

In an embodiment, the sliding element engages in the slotted link channel in an engagement direction, which in particular, at least substantially, can coincide with the preloading direction. A preloading direction is to mean in particular the direction in which a resultant of the preload is directed, for example the longitudinal axis of a compression spring or of a normal on an elastic bar. In an embodiment, the engagement or preloading direction intersects at least substantially the axis of rotation of the rocker. Because of this, in particular with a slotted link channel is a curved circumferential surface, an advantageous engagement of the sliding element can be ensured in an embodiment.

In an embodiment, the sliding element is at least substantially moveable perpendicularly to the engagement direction relative to the slotted link channel in order to be able to follow the latter. To this end, the carrier, on which the sliding element is arranged, can be rotatably mounted on the housing in an embodiment, on, in particular in which in an embodiment the rocker is rotatably mounted. In a further development, the axis of rotation of the rotary bearing of the carrier is offset at least substantially perpendicularly to the axis of rotation of the rocker. Equally, the carrier can also be fastened to the housing in a fixed manner, in particular clamped. The movability of the sliding element perpendicularly to the engagement direction can then be realized in particular through a corresponding elastic deformation of the carrier. Accordingly, the carrier, in an embodiment, can be additionally or alternatively formed elastically perpendicularly to the engagement direction, in particular rod-shaped. Equally, the sliding element can also be guided or displaceably mounted in the housing or the rocker perpendicularly to the engagement direction, for example in a linear guide, in order to follow the slotted link channel which is arranged on the rocker or housing. In an embodiment, the bolt includes an elongated hole, in which a protrusion of the bolt is guided, in order to couple bolt and rocker to one another. The elongated hole in an embodiment can be open on one side in order to facilitate assembly. The engagement or preloading direction in a further development can be aligned at least substantially with a longitudinal axis of the elongated hole. Coupling by means of an elongated hole in an embodiment is loaded less, in particular not loaded by the preload of the sliding element.

According to a further aspect of the present disclosure, which in an embodiment can be combined with the above aspect, in particular the arrangement of the slotted link guide on the circumferential side of the rocker, an in particular disc-like holding element is rotatably mounted on the bolt, which in an open position is rotated out of engagement with the lid and in a closing position rotated into engagement with the lid in order to positively lock the latter.

In the open position, the holding element can be rotated out of engagement with the lid through an opening stop. Equally, it can also be preloaded or set out of engagement through a spring means. In the closing position, the holding element can be rotated into engagement with the lid through a closing stop. Equally, it can also be preloaded or set into engagement through a spring means. In an embodiment, opening and closing stop can be at least substantially perpendicular to one another, in particular in order to bring about a compact positive guidance of the holding element.

In an embodiment, the holding element can be received in the open position in an outer contour of the bolt and in the closing position protrude over said outer contour.

Through the rotatably mounted holding element, which in the closing position is rotated into engagement with the lid, locking the latter, a screwing movement for engaging fixed protrusions on the bolt can be avoided in an embodiment, and the operational safety increased in particular. A lid can include in particular a guide sleeve, into which the bolt can be retracted, and which has one or multiple recesses, into which the turned-out holding element engages. The recess(es) can in particular have a closed circumference and be thus more reliably formed than axially open recesses for the helical introduction of fixed bolt protrusions.

According to an aspect of the present disclosure, the bolt of the lid locking arrangement can be alternatingly brought into and out of engagement with the lid through successive axial displacements, in particular through successive pressing-down of the lid, in order to lock and unlock the latter.

BRIEF DESCRIPTION OF THE DRAWINGS

The present disclosure will hereinafter be described in conjunction with the following drawing figures, wherein like numerals denote like elements, and.

DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
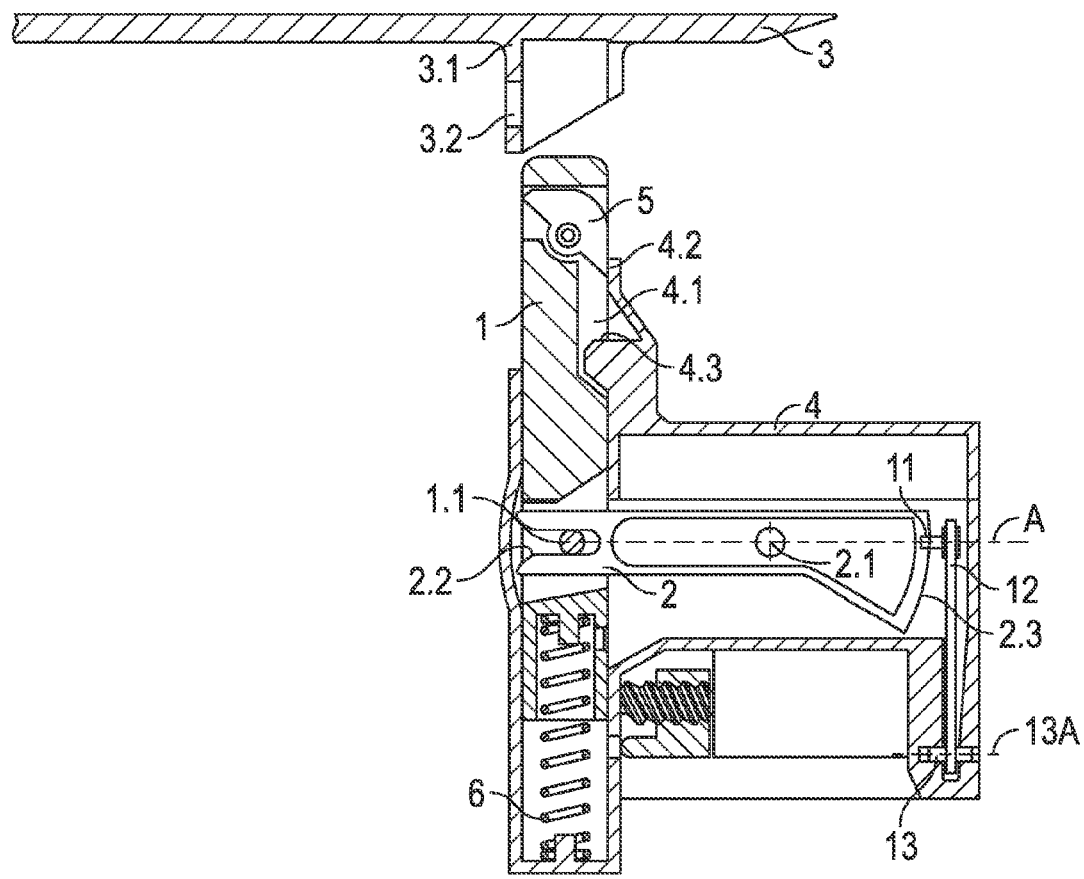
FIG. 1A is a pivotable lid and a lid locking arrangement of a motor vehicle according to an embodiment of the present disclosure in an open position in a section.

FIG. 1A shows in a section perpendicular to an axis of rotation of a rocker 2 a lid locking arrangement for the push-push locking and unlocking of a pivotable tank lid 3 of a motor vehicle in an open position.

The lid locking arrangement includes a bolt 1, which is axially (in FIG. 1A vertically) displaceably guided in a housing 4 through an axial groove 4.1 in a rotationally fixed manner and has a substantially cylindrical outer contour. The axial guidance of the bolt 1 can be additionally or alternatively affected also through the rocker 2.

The rocker 2 is rotatably mounted in the housing 4 about an axis of rotation 2.1 and coupled to the bolt 1 in such a manner that an axial retraction and extension of the bolt brings about rotational movements of the rocker 2 about its axis of rotation 2.1 in the opposite direction. To this end, the rocker 2 has an elongated hole 2.2 which is open on one side, in which a radial protrusion 1.1 of the bolt 1 is guided.

Figure 1B:
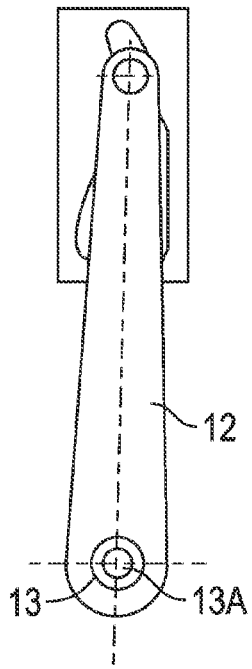
FIG. 1B is a top view of a slotted link guide of the arrangement of FIG. 1A in engagement and preloading direction.
Figure 1C:
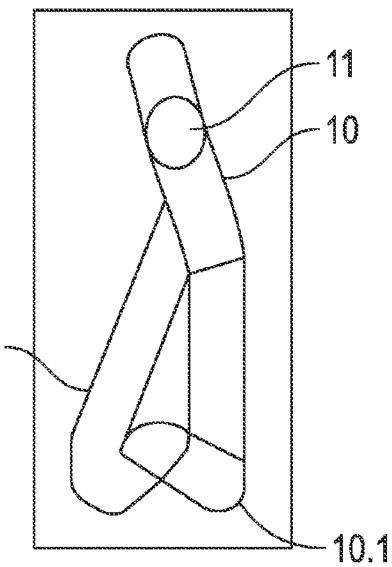
FIG. 1C a top view of a slotted link channel and a sliding element of the slotted link guide of FIG. 1B without carrier.

A slotted link guide of the lid locking arrangement is individually shown in FIG. 1B in a top view in engagement direction A (horizontally from right to left in FIG. 1A) and includes a slotted link channel 10 and a sliding element which is guided therein. FIG. 1C shows the slotted link channel 10 in the manner corresponding to FIG. 1B and the sliding element 11 alone without a carrier 12, on which the sliding element 11 is arranged (see FIG. 1A).

The slotted link channel 10 is arranged on a circumferential side 2.3 of the rocker 2, which is rotation-symmetrically formed about the axis of rotation 2.1 of the rocker 2. The bar-shaped carrier 12, on which the sliding element 11 is arranged, is elastically formed in a preload direction, which coincides with the engagement direction A and on an end which is located opposite the sliding element 11 (at the bottom in FIG. 1A, 1B) fastened in a rotary bearing 13 with an axis of rotation 13A in such a manner on the housing 4 that it elastically preloads the sliding element 11 against a stepped channel base of the slotted link channel 10 and is rotationally moveable perpendicularly to the engagement direction, i.e. out of the figure plane of FIG. 1A or into the latter relative to the slotted link channel 10 in order to be able to follow the latter. The axis of rotation 13A of the rotary bearing 13 of the carrier 12 is offset downwards perpendicularly to the axis of rotation of the rocker 2 in FIG. 1A. In a modification which is not shown, the carrier 10 is clamped in on the housing 4 in a fixed manner and formed elastically deformable perpendicularly to the engagement direction. In a further modification which is not shown, the sliding element 11 is guided or displaceably mounted in a linear guide perpendicularly to the engagement direction in the housing 4, in order to follow the slotted link channel 10 which is arranged on the rocker 2. In engagement direction, it can be preloaded for example through a compression spring.

In the exemplary embodiment, the carrier 12 preloads the sliding element 11 over the entire course of the slotted link channel 10 against the latter, in a modification at any rate in the portion of the shoulder 10.1, which is adjacent arranged before the engagement position in passage direction.

The sliding element 11 is formed cylindrically and engages into the slotted link channel 10 in its cylinder longitudinal axis.

The slotted link channel 10 is formed heart-shaped, as is evident in particular in the top view of FIG. 1C, and includes two concave portions (left, right in FIG. 1C) in opposite directions, wherein in an in FIG. 1C lower transition between these two portions an engagement position is formed and the in FIG. 1C right region is extended beyond a transition between the two portions (top in FIG. 1C) located opposite this engagement position.

The slotted link channel 10 is stepped in the preloading direction (A) (from right to left in FIG. 1A; perpendicularly on the drawing plane of FIG. 1B, 1C) through multiple ramp-like shoulders (10.1, 10.2), which counteract a movement of the sliding element 11 against a predetermined passage direction, which in FIG. 1C is orientated in clockwise direction. These shoulders 10.1, 10.2 counteract a movement of the sliding element 11 against the predetermined passage direction or block the latter positively: the preloaded sliding element 11 can be moved through the slotted link channel 10 in passage direction and on riding over a shoulder 10.1, 10.2 engages more deeply behind said shoulder into the slotted link channel 10. Through the ramp-like shoulders it is again lifted against the engagement direction A which coincides with the preloading direction during the further movement in passage direction against its elastic preload. For the mode of operation in principle, reference is complementarily made to FIG. 5 of US 2010/0045049 A1.

The engagement or preloading direction A intersects the axis of rotation 2.1 of the rocker 2 and the protrusion 1.1 of the bolt 1 (see FIG. 1A).

On the bolt 1, a disc-like holding element 5 is rotatably mounted, which in an open position (FIG. 1A) is rotated out of engagement with the lid 3 and in a closing position (FIG. 2A) into engagement with the lid 3, in order to positively lock the latter.

In the open position, the holding element 5 is rotated out of engagement with the lid through a housing-fixed opening stop 4.2 (see FIG. 1A). In the closing position (see FIG. 2A), the holding element is rotated into engagement with the lid 3 through a housing-fixed closing stop 4.3.

Figure 2A:
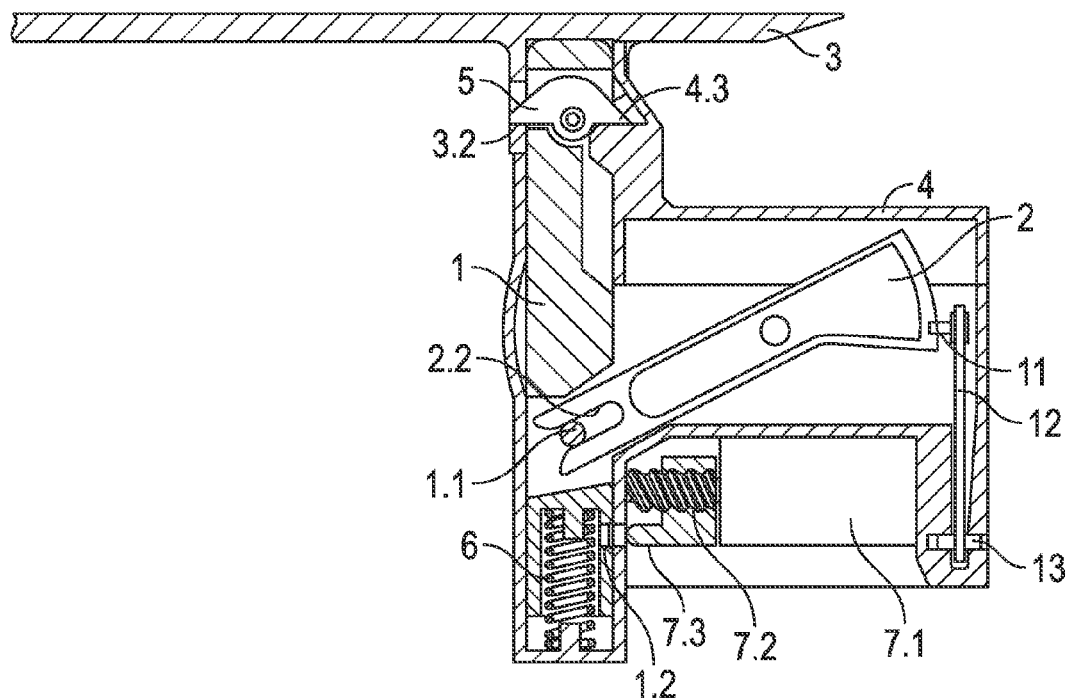
FIGS. 2A and 2B are the arrangement of FIGS. 1A, 1B in a closing position.
Figure 2B:
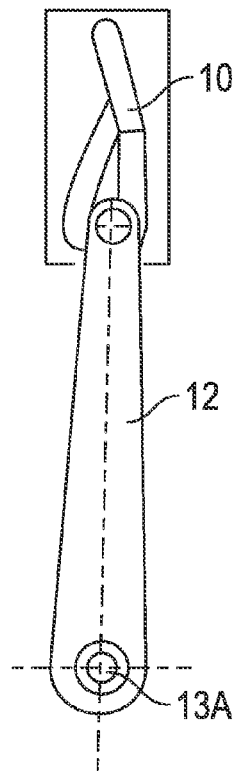

In the open position, the holding element 5 is received in an outer contour of the bolt 1, as is evident in FIG. 1A, while in the closing position it protrudes over said outer contour (see FIG. 2A).

The lid 3 includes a guide sleeve 3.1, into which the bolt 1 can be retracted, and which includes a recess 3.2 into which the turned-out holding element 5 engages and which has a closed circumference.

The engagement or preloading direction A is substantially aligned with a longitudinal axis of the elongated hole 2.2 as evident in particular in FIG. 1A.

The push-push function is explained in the following: starting out from the open position of FIG. 1A, the lid 3 is manually pivoted towards the bolt 1 (FIG. 1A→FIG. 2A). In the process, the axially extended bolt 1 retracts into the guide sleeve 3.1 of the lid 3.

During the axial retraction of the bolt 1 (vertically downwards in FIG. 1A) said bolt preloads a compression spring 6, which tends to extend the bolt 1. On riding up against the closing stop 4.3 the holding element 5 in FIG. 1A is twisted in anti-clockwise direction so that it protrudes over the outer contour of the bolt 1 and positively engages into the recess 3.2 of the lid 3.

Through the axial retraction of the bolt 1, the rocker 2 which is coupled to said bolt 1 is rotated in FIG. 1A about its axis of rotation 2.1 in anti-clockwise direction (see FIG. 2A). In the process, the sliding element 11 passes through the slotted link channel 10 in passage direction (in clockwise direction in FIG. 1C), wherein the carrier 12 rotates in its rotary bearing 13. In the closing position, it reaches the engagement position, in which it is positively prevented by the ramp-like stop 10.1 from moving back against the passage direction, behind which because of the preload of the elastic carrier 12 in engagement or preloading direction A it is dipped more deeply into the slotted link channel 10. In this closing position of FIG. 2A, the stop 10.1 prevents a return rotating of the rocker 2, thus an extending of the bolt 1 which is coupled to the latter and thus a pivoting-open of the lid 3 which is releasably coupled to said bolt 1 via the holding element 5.

Figure 3:
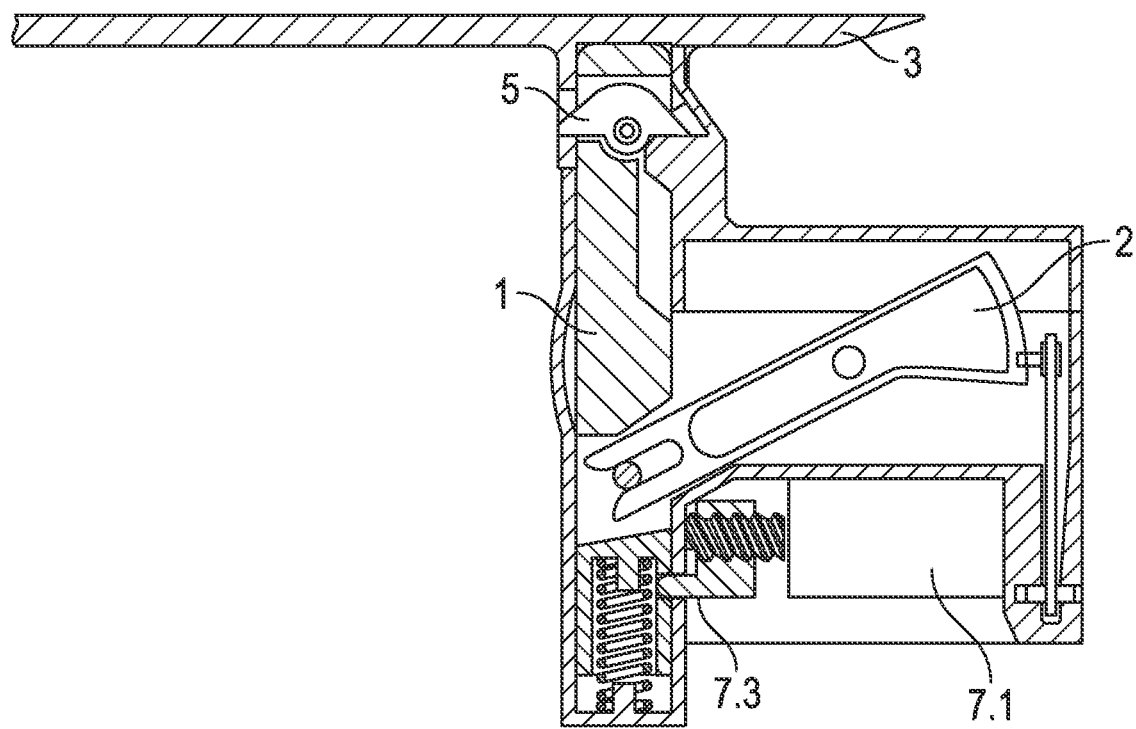
FIG. 3 is the arrangement of FIG. 2A in an electrically locked position.

Following this, the lid locking arrangement can be electrically locked, compare the position of protrusion 7.3 in FIG. 2A and FIG. 3. To this end, an electric motor 7.1 radially drives a protrusion 7.3 into a recess 1.2 of the bolt 1 via a worm gear 7.2. Through actuation in the opposite direction, the electric motor 7.1 can pull the protrusion 7.3 out of the recess 1.2 and in this way electrically lock the lid locking arrangement.

For mechanically unlocking, the user again presses on the lid 3. Through the axial movement of the bolt 1 which is coupled therewith, the rocker 2 which is coupled therewith is rotated. In the process, the sliding element 11 migrates out of its engagement position in passage direction further through the slotted link channel 10 because of the blocking action of the shoulder 10.1, while the carrier 12 rotates in its rotary bearing 13. The spring 6 now axially extends the bolt 1 (compare FIG. 2A with FIG. 1A). In the process, the opening stop 4.2 again retracts the holding element 5 into the outer contour of the bolt 1 and thus out of engagement with the recess 3.2 of the lid 3. The latter is released because of this and can be pivoted open further (in FIG. 1A, in anti-clockwise direction).

The in FIG. 1C right portion of the heart-shaped slotted link channel 10 is extended beyond the transition (top in FIG. 1C) located opposite the engagement position (bottom in FIG. 1C) between the two concave portions in opposite direction. The other in FIG. 1C left portion merges with this extended portion with the ramp-like shoulder 10.2, so that this shoulder 10.2 counteracts a movement of the sliding element 11 against the passage direction into the other, in FIG. 1C left portion, when the sliding element 11 is moved out of the position shown in FIG. 1C in passage direction (in clockwise direction in FIG. 1C). This ramp-like shoulder 10.2 thus acts as a rigid point. In a modification, the slotted link channel 10 in this region can also be formed without shoulder of lid.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A locking arrangement for a pivotable lid of a motor vehicle comprising:
   an axially-displaceable guided bolt releasably engaged with the lid;
   a rotatably mounted rocker operably coupled to the bolt;
   a holding element rotatably mounted on the bolt; and
   a slotted link guide with a slotted link channel and a sliding element guided therein;
   wherein the slotted link channel has an engagement position and counteracts a movement of the sliding element out of the engagement position against a predetermined passage direction; and
   wherein the slotted link channel of the slotted link guide is arranged on a lateral side of a circumferential portion of the rocker about its axis of rotation.

2. The locking arrangement according to claim 1, wherein the slotted link channel is arranged on the circumferential side of the rocker.

3. The locking arrangement according to claim 1, wherein the circumferential side of the rocker is at least substantially formed rotation-symmetrically about the axis of rotation of the rocker.

4. The locking arrangement according to claim 1, wherein the sliding element in an engagement direction engages in the slotted link channel which, at least substantially, intersects the axis of rotation of the rocker.

5. The locking arrangement according to claim 1, wherein the channel base comprises at least one ramp-like shoulder defining the engagement position, and wherein the sliding element is elastically preloaded against a stepped channel base of the slotted link channel.

6. The locking arrangement according to claim 1, wherein the sliding element is arranged on a carrier which is elastically formed in a preload direction and rotatably mounted.

7. The locking arrangement according to claim 1, wherein one of the bolt and the rocker coupled therewith comprises an elongated hole in which a protrusion of the other one of the bolt and the rocker is displaceably guided.

8. The locking arrangement according to claim 1, wherein the slotted link channel is formed heart-shaped.

9. A locking arrangement for a pivotable lid of a motor vehicle comprising:
- an axially displaceably guided bolt releasably engaged with a lid;
- a rotatably mounted rocker coupled to the bolt;
- a holding element rotatably mounted on the bolt; and
- a slotted link guide with a slotted link channel and a sliding element which is guided therein;
- wherein the slotted link channel of the slotted link guide is arranged on a lateral side of a circumferential portion of the rocker about its axis of rotation;
- wherein the slotted link channel has an engagement position and counteracts a movement of the sliding element out of the engagement position against a predetermined passage direction; and
- wherein, the holding element in an open position is rotated out of engagement with the lid, and in a closing position the holding element is rotated into engagement with the lid, in order to positively lock thereto.

10. The locking arrangement according to claim 9, wherein the holding element in the open position is rotated through an opening stop out of engagement with the lid, and in the closing position is rotated into engagement with the lid through a closing stop.

11. The locking arrangement according to claim 9, wherein the holding element in the open position is received in an outer contour of the bolt and in the closing position protrudes over said outer contour.

12. The locking arrangement according to claim 9, wherein the bolt is guided for axial displacement in a rotationally fixed manner.

13. A pivotable lid for a motor vehicle in combination with a locking arrangement according to claim 9, wherein the bolt of the locking arrangement can be alternately brought into and out of engagement with the lid through successive axial displacements for locking and unlocking the lid.

\* \* \* \* \*